United States Patent [19]
Barresi

[11] Patent Number: 6,099,001
[45] Date of Patent: Aug. 8, 2000

[54] DRIVE SHAFT UTILITY CART

[76] Inventor: Natale Barresi, 617 Seventh St., Lyndhurst, N.J. 07071

[21] Appl. No.: 09/131,068

[22] Filed: Aug. 7, 1998

[51] Int. Cl.⁷ ........................................... B62B 1/00
[52] U.S. Cl. ............................................... 280/79.6
[58] Field of Search ............................... 280/79.6, 79.11, 280/79.7, DIG. 11, 47.34, 47.35; 211/206, 60.1

[56] References Cited

U.S. PATENT DOCUMENTS

| | | | |
|---|---|---|---|
| 1,608,552 | 11/1926 | Ellis | 280/79.6 |
| 2,851,235 | 9/1958 | Henig | 280/79.6 |
| 3,503,525 | 3/1970 | Loebner | 211/206 |
| 3,831,959 | 8/1974 | Fontana | 280/79.11 |
| 5,871,219 | 2/1999 | Elliott | 280/79.3 |

FOREIGN PATENT DOCUMENTS

| | | | |
|---|---|---|---|
| 562189 | 6/1944 | United Kingdom | 211/60.1 |
| 989519 | 4/1965 | United Kingdom | 280/79.3 |
| 1061667 | 3/1967 | United Kingdom | 280/79.6 |
| 1337588 | 11/1973 | United Kingdom | 280/79.6 |

*Primary Examiner*—Brian L. Johnson
*Assistant Examiner*—Gerald Klebe
*Attorney, Agent, or Firm*—Goldstein & Canino

[57] ABSTRACT

A drive shaft utility cart, for supporting, storing, and transporting a drive shaft, comprising a pair of bases and a pair of vertical end supports which each extend upward from one of the bases. A primary cross bar extends between the vertical end supports, and a secondary cross bar extends between the vertical end supports, parallel to the primary cross bar. A pair of end cradles are located immediately above the vertical end supports. A middle cradle is located midway between the vertical end supports. A middle vertical support extends between the primary cross bar and secondary cross bar immediately below the middle cradle. The bases each have four perpendicular members which extend horizontally in substantially the same plane. The perpendicular members meet at a center point, and each have an end point fully opposite from the center point. The vertical supports extend vertically upward from the center point. A swivel caster is located at each of the end points to provide rotatability and manueverability for the utility cart.

3 Claims, 2 Drawing Sheets

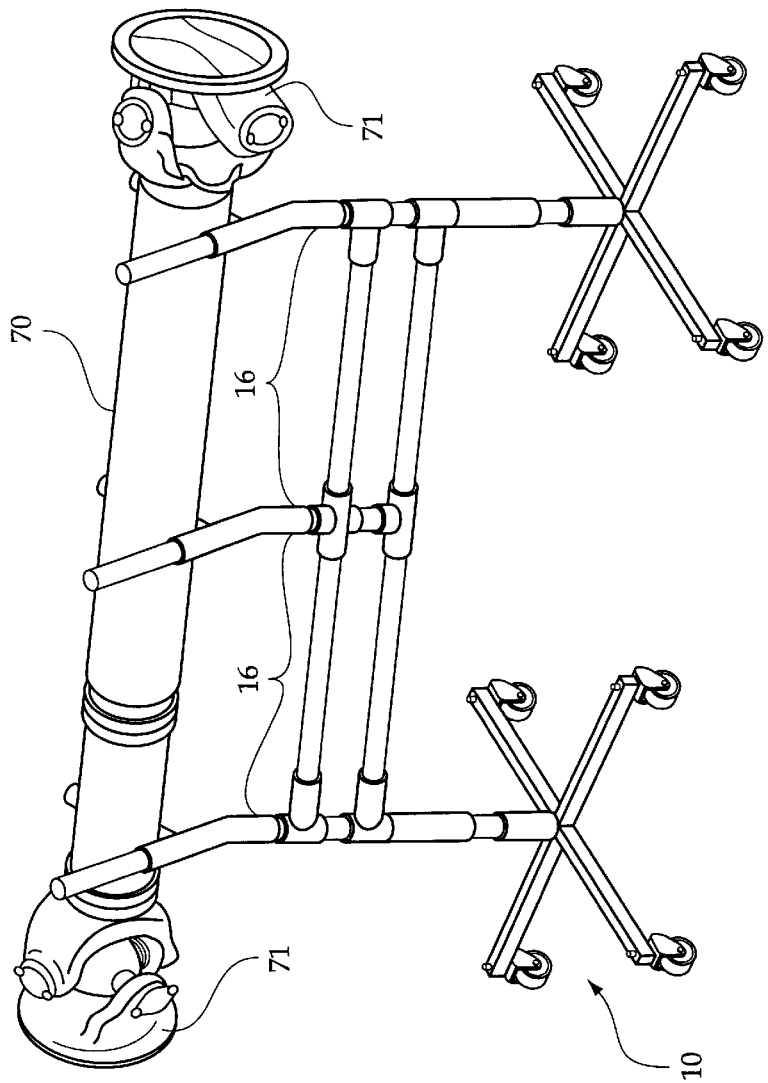
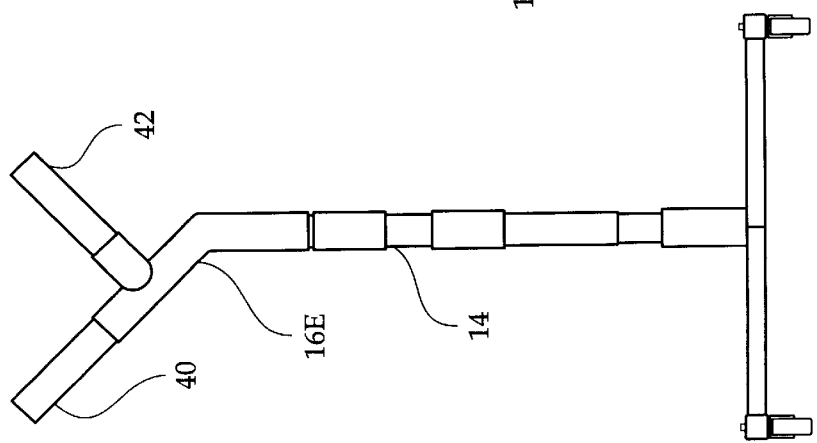
Fig. 3
Fig. 2

DRIVE SHAFT UTILITY CART

BACKGROUND OF THE INVENTION

The invention relates to a drive shaft utility cart. More particularly, the invention relates to a cart which is particularly configured for supporting, handling, and transporting a drive shaft while work is being performed on the drive shaft, or upon a vehicle or machine containing the drive shaft.

In most vehicles and in many machines, a drive shaft is present. The drive shaft often must transmit considerable power, and undergo significant stresses. Thus, the drive shaft is designed with strong components to withstand these stresses. With this strength comes added weight. Thus, drive shaft components, and thus the overall driveshaft, can be extremely heavy.

Generally when raising a vehicle using a hydraulic lift, the drive shaft need not be supported. However, when certain portions of the drive shaft and suspension are serviced or replaced, direct support must be provided for the drive shaft.

U.S. Pat. No. 2,536,561 to Mickam discloses a rug and linoleum transfer car, which employs a cradle which is directly supported upon a wheeled platform. The rug supported by the cradle is thus held close to the ground surface.

U.S. Pat. No. 5,037,118 to Straube similarly discloses a brush and log hauling cart. U.S. Pat. No. 1,104,697 to Morrell discloses a cotton lap roll truck.

While these units may be suitable for the particular purpose employed, or for general use, they would not be as suitable for the purposes of the present invention as disclosed hereafter.

SUMMARY OF THE INVENTION

It is an object of the invention to produce a drive shaft utility cart which is capable of supporting a heavy, elongated object, such as a drive shaft. Accordingly, the drive shaft utility cart is provided with cradles for directly supporting the drive shaft.

It is another object of the invention to provide a drive shaft utility cart which allows the drive shaft thus supported to be easily moved. Accordingly, the cart is supported upon swiveling casters which allow three hundred sixty degree rotation of the cart, and superior maneuverability thereof to allow the drive shaft to be placed into any desired location or position while working thereon.

It is still another object of the invention that the drive shaft is well supported on the cart. Accordingly, three cradles are provided to ensure that the drive shaft stays positioned within the cradles.

It is yet a further object of the invention to configure the utility cart so that it is capable of supporting considerable weight. Accordingly, a secondary cross bar is employed, along with a middle vertical support which extends between the cross bar and the secondary cross bar.

The invention is a drive shaft utility cart, for supporting, storing, and transporting a drive shaft, comprising a pair of bases and a pair of vertical end supports which each extend upward from one of the bases. A primary cross bar extends between the vertical end supports, and a secondary cross bar extends between the vertical end supports, parallel to the primary cross bar. A pair of end cradles are located immediately above the vertical end supports. A middle cradle is located midway between the vertical end supports. A middle vertical support extends between the primary cross bar and secondary cross bar immediately below the middle cradle. The bases each have four perpendicular members which extend horizontally in substantially the same plane. The perpendicular members meet at a center point, and each have an end point fully opposite from the center point. The vertical supports extend vertically upward from the center point. A swivel caster is located at each of the end points to provide rotatability and maneuverability for the utility cart.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 2 is a side elevational view thereof.

FIG. 3 is a diagrammatic perspective view, illustrating the invention being used to support a drive shaft.

DETAILED DESCRIPTION OF THE PREFERRED EMBODIMENTS

Figure 1:
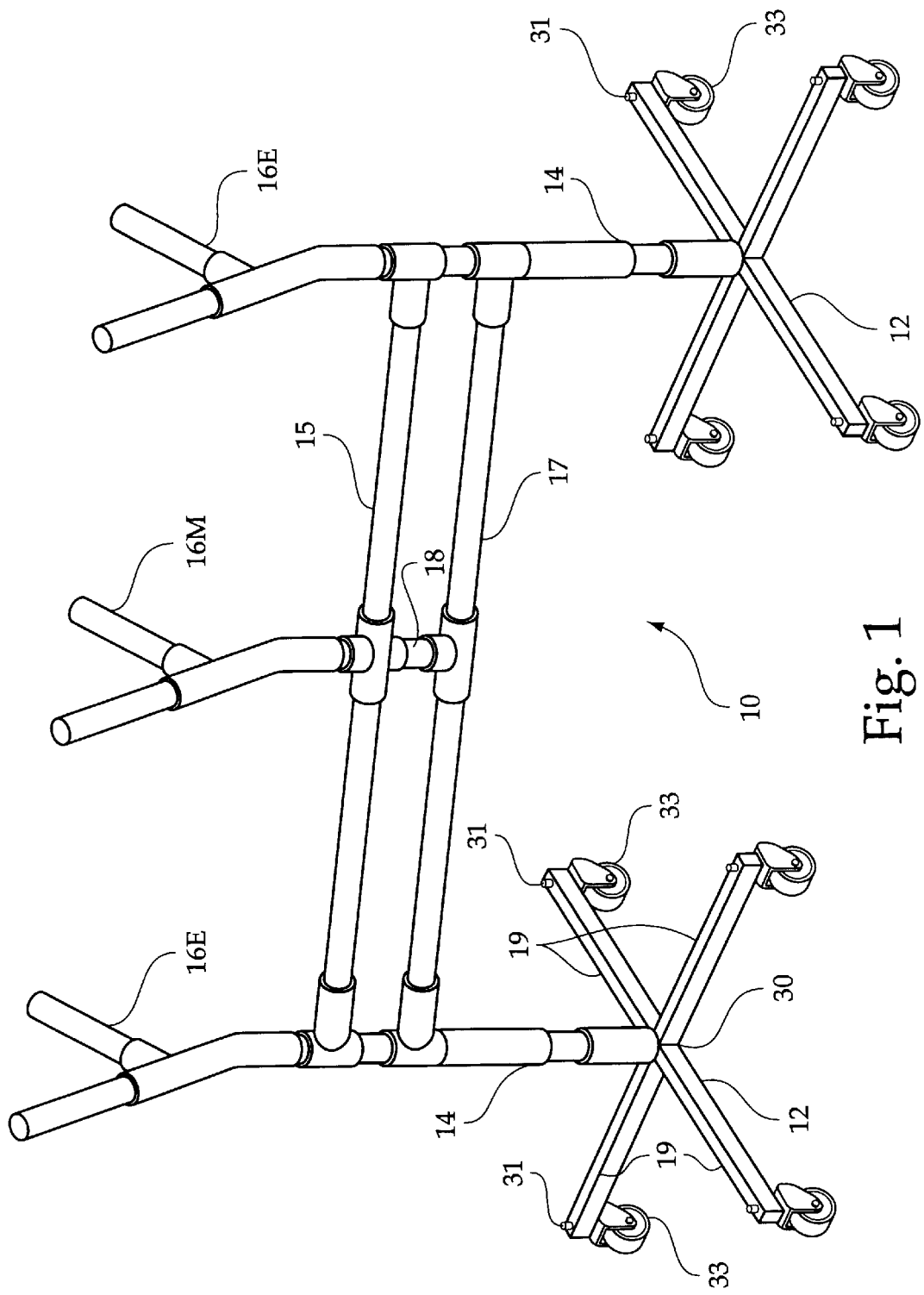
FIG. 1 is a diagrammatic perspective view, illustrating the invention, per se.

FIG. 1 illustrates a drive shaft utility cart 10, which comprises a pair of bases 12, and a pair of vertical end supports 14, each extending from one of the bases 12. A primary cross bar 15 extends between the vertical end supports 14. Several cradles are supported by the vertical end supports 14 and cross bar 15. In particular, two end cradles 16E are supported directly by the vertical end supports 14, and a middle cradle 16M is supported by cross bar 15 midway between the vertical end supports 14.

The rigidity and strength afforded by the primary cross bar 15 is enhanced by a secondary cross bar 17. The secondary cross bar 17 extends parallel to the primary cross bar 15. A middle vertical support 18 extends between the secondary cross bar 17 and the primary cross bar 15. The middle vertical support 18 is located midway between the vertical end supports 14. Thus, the middle cradle 16M is supported directly above the middle vertical support 18.

Each of the bases 12 comprise four perpendicular base members 19 which extend horizontally in substantially the same plane. The base members 19 all meet at a center point 30. The vertical end supports 14 each extend directly upward from the center point 30 of one of the bases 12. The base members 19 each have an end point 31 fully opposite the center point 30. A swivel caster 33 is located at the end point of each base member 19. Thus, four swivel casters 33 are provided for each base 12. This arrangement of a total of eight swivel casters allows easy maneuverability of the cart 10. In fact, the cart can easily be rotated three hundred sixty degrees, about its own axis. Further, the cart can be easily positioned at any location where the work is to be performed, or to keep it "out of the way" while work progresses.

Referring to FIG. 2, each of the end cradles 16E comprise a main cradle support 40 which extends directly from the vertical end support 14, and forms an obtuse angle therewith. In fact, the main cradle support 40 is generally a continuation of the vertical end support 14 which is defined as point beyond a bending of the vertical end support 14. A secondary cradle support 42 extends substantially perpendicularly upward from the main cradle support 40, thus creating a perpendicular notch within which an object may be supported.

Referring to FIG. 3, a drive shaft 70 is illustrated being supported by the cart 10. The drive shaft 70 is substantially elongated, and has a multitude of protrusions 71, which could be power transmission and differential gear boxes, or the like. The drive shaft 70 is supported within the cradles 16, with the protrusions 71 thereof lying outside or between the cradles 16. Once the drive shaft 70 is suitably and securely positioned within the cradles 16, the cart can be easily moved to any desired position.

In conclusion, herein is presented a drive shaft utility cart which is configured to securely and conveniently support a drive shaft. Once the drive shaft is supported by the cart, it may be easily rotated a full three hundred sixty degrees, or may be wheeled to any location necessary to perform work on the drive shaft or to store the drive shaft while work progresses on the vehicle.

What is claimed is:

1. A drive shaft utility cart, for supporting and transporting a drive shaft, comprising:

a pair of bases, each base having a plurality of swivel casters;

a pair of vertical end supports, each vertical end support extending vertically from one of the bases;

a middle cradle located midway between the vertical end supports;

a primary cross bar extending between vertical supports; and a pair of end cradles, each end cradle mounted to one of the vertical supports, for cradling the drive shaft therein so that said drive shaft may be transported by moving the cart;

a secondary cross bar, the secondary cross bar extending parallel to and beneath the primary cross bar, and a middle vertical support extending between the primary cross bar and secondary cross bar immediately beneath the middle cradle.

2. The drive shaft utility cart as recited in claim 1, wherein each base comprises four perpendicular base members extending horizontally in substantially the same plane, the base members all meet at a center point, the base members each have an end point fully opposite the center point, one of the swivel casters is mounted beneath each end point.

3. The drive shaft utility cart as recited in claim 2, wherein the end cradles comprise a main cradle support which extends directly from the vertical end support, forming an obtuse angle therewith, and a secondary cradle support which extends substantially perpendicularly upward from the main cradle support, thus creating a perpendicular notch within which the drive shaft is supported.

* * * * *